United States Patent
Liu et al.

(10) Patent No.: US 11,636,066 B2
(45) Date of Patent: Apr. 25, 2023

(54) TERMINAL AND METHOD FOR NAMING FOLDER

(71) Applicant: Huawei Technologies Co., Ltd., Shenzhen (CN)

(72) Inventors: Huaxi Liu, Beijing (CN); Jun Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 518 days.

(21) Appl. No.: 16/632,796

(22) PCT Filed: Jul. 24, 2018

(86) PCT No.: PCT/CN2018/096776
§ 371 (c)(1),
(2) Date: Jan. 21, 2020

(87) PCT Pub. No.: WO2019/019999
PCT Pub. Date: Jan. 31, 2019

(65) Prior Publication Data
US 2020/0151141 A1    May 14, 2020

(30) Foreign Application Priority Data
Jul. 28, 2017   (CN) .......................... 201710632174.3

(51) Int. Cl.
*G06F 16/16* (2019.01)
(52) U.S. Cl.
CPC .......... *G06F 16/164* (2019.01); *G06F 16/168* (2019.01)

(58) Field of Classification Search
CPC ........................... G06F 16/164; G06F 16/168
See application file for complete search history.

(56) References Cited

U.S. PATENT DOCUMENTS

| | | | |
|---|---|---|---|
| 9,658,738 B1 * | 5/2017 | Park ...................... | G06F 16/903 |
| 10,127,037 B2 * | 11/2018 | Li ......................... | G06F 16/148 |
| 2012/0203640 A1 * | 8/2012 | Karmarkar ............ | G06F 1/1686 |
| | | | 705/14.66 |

(Continued)

FOREIGN PATENT DOCUMENTS

| CA | 2829597 A1 * | 9/2012 | ............ G06F 16/58 |
|---|---|---|---|
| CN | 102135992 A | 7/2011 | |

(Continued)

OTHER PUBLICATIONS

Yang, Z., et al., "Computer Foundation and Application", Mar. 31, 2015, 1 page.

(Continued)

*Primary Examiner* — James Trujillo
*Assistant Examiner* — Michal Bogacki
(74) *Attorney, Agent, or Firm* — Conley Rose, P.C.

(57) ABSTRACT

A terminal and a method for naming a folder include receiving, by the terminal, indication information concerning creating or updating a folder, where the folder includes at least one application, displaying, by the terminal, at least one recommended name for the folder based on an application type of each of the at least one application, and selecting, by the terminal, one of the at least one recommended names as a name of the folder based on confirmation information from a user.

9 Claims, 10 Drawing Sheets

(56) References Cited

U.S. PATENT DOCUMENTS

| | | | | |
|---|---|---|---|---|
| 2013/0093899 A1* | 4/2013 | Curcio | ............... | G06F 16/58 |
| | | | | 707/E17.089 |
| 2013/0138674 A1* | 5/2013 | Jeong | ............... | G06F 16/90335 |
| | | | | 707/758 |
| 2013/0145269 A1* | 6/2013 | Latulipe | ............... | H04N 21/854 |
| | | | | 715/720 |
| 2013/0157682 A1* | 6/2013 | Ling | ............... | H04W 4/02 |
| | | | | 455/456.1 |
| 2018/0300027 A1* | 10/2018 | Cao | ............... | G06F 3/0484 |
| 2018/0329607 A1* | 11/2018 | Han | ............... | G06F 3/04883 |

FOREIGN PATENT DOCUMENTS

| | | |
|---|---|---|
| CN | 102930444 A | 2/2013 |
| CN | 103440144 A | 12/2013 |
| CN | 103955536 A | 7/2014 |
| CN | 104573005 A | 4/2015 |
| CN | 105677891 A | 6/2016 |
| CN | 105893548 A | 8/2016 |
| CN | 105955757 A | 9/2016 |
| CN | 105956076 A | 9/2016 |
| CN | 106227400 A | 12/2016 |
| CN | 106445619 A | 2/2017 |
| CN | 106569860 A | 4/2017 |
| CN | 106598583 A | 4/2017 |
| CN | 106649512 A | 5/2017 |
| CN | 106649633 A | 5/2017 |
| WO | 2017078500 A1 | 5/2017 |

OTHER PUBLICATIONS

Anonymous, "What is a mobile phone sensor? What are the classifications and functions of mobile phone sensors?," https://www.qizuang.com/gonglue/jjsh/29001.html, Dec. 19, 2016, 5 pages.

Duke, "Analysis of mainstream sensor types and related application scenarios," http://www.elecfans.com/monijishu/wuxian_chuangan/433123.html, Aug. 26, 2016, 5 pages.

Old wheat, Those apps born out of sensors, htttps://sspai.com/post/23125, Apr. 18, 2013, 12 pages.

\* cited by examiner

TERMINAL AND METHOD FOR NAMING FOLDER

CROSS-REFERENCE TO RELATED APPLICATIONS

This application is a U.S. National Stage of International Patent Application No. PCT/CN2018/096776 filed on Jul. 24, 2018, which claims priority to Chinese Patent Application No. 201710632174.3 filed on Jul. 28, 2017. Both of the aforementioned applications are hereby incorporated by reference in their entireties.

TECHNICAL FIELD

The present invention relates to the field of computers, and in particular, to a terminal and a method for naming a folder.

BACKGROUND

With development of terminal functions, more applications are installed by a user. For convenient management and operation, the user tends to manually drag a plurality of applications into one folder. In this case, how to quickly and reasonably finish naming the folder becomes an important task. To effectively resolve this problem, a reasonable naming rule and convenient interaction between user interfaces (User Interface, UI) need to be ensured.

In the prior art, there are three common methods for naming a folder. In the first method, a form of "folder n" (n represents a quantity of current folders) is adopted to name a folder. In the second method, a user-defined entering manner is adopted to name a folder. In the third method, information based on a first application in a folder is used to name a folder.

The naming rule adopted in the first method usually cannot satisfy the user. As a result, the user needs to re-enter a name, which causes bad user experience. The second method totally depends on the user to enter a name, which has low naming efficiency and causes poor user experience. The third method is relatively unreasonable for naming when a folder includes a plurality of applications. In conclusion, the methods for naming a folder in the prior art are all unreasonable, and provide poor user experience.

SUMMARY

Embodiments of the present invention provide a terminal and a method for naming a folder, where a naming rule is reasonable and user experience is excellent.

According to a first aspect, a method for naming a folder is provided. A terminal receives indication information about creating or updating a folder, where the folder includes at least one application. The terminal displays at least one recommended name for the folder based on an application type of each of the at least one application. The terminal uses one of the at least one recommended name as a name of the folder based on confirmation information from a user. Application scenarios in this embodiment of the present invention are not limited to a scenario in which a user first creates a folder, but further include a scenario in which the user updates the folder. For example, when a user first creates a folder, the folder includes an application A and an application B, and then the user adds an application C to the folder. Such a scenario of adding an application to a folder or deleting an application from a folder may be referred to as a scenario of updating a folder. That is, when a folder is updated, the folder may be renamed.

In an embodiment of the present invention, when receiving the indication information about creating or updating a folder, the terminal displays the at least one recommended name for the folder based on the application type of the application included in the folder. These recommended names are determined based on the application type of the application, so that a user requirement is relatively easy to meet. In addition, a naming rule is reasonable and the user can select one of these recommended names as a name of the folder. An operation is convenient and user experience is excellent.

In a possible implementation, before the terminal receives the indication information about creating or updating a folder, the terminal determines the application type of each of the at least one application in at least one of the following manners: receiving, by the terminal, information that is pushed by a cloud and that is about the application type of each of the at least one application; querying, by the terminal, information in an application configuration file, and determining the application type of the application based on the information in the application configuration file; and/or determining, by the terminal, the application type of the application based on information about a sensor used in an application running process. According to this implementation, the terminal may directly obtains from the cloud application types of all applications or application types of some applications in the folder: or the terminal may query the information in the application configuration file, and determine the application type of the application based on the information in the application configuration file, that is, determine the application type of the application based on a static feature of the application; or the terminal may determine the application type of the application based on the information about the sensor used in the application running process, that is, determine the application type of the application based on a dynamic feature of the application. Therefore, the terminal can accurately determine the application type of the application.

In a possible implementation, each application type has a corresponding identification feature; and if detecting that a feature in the application running process matches a preset identification feature of a first application type, the terminal determines that the application type of the application is the first application type, and the preset identification feature of the first application type includes the information about the sensor. According to this implementation, there are various application types currently, so that whether an identification feature of each application type matches the application type is checked one by one, processing efficiency can be improved, and the application type of the application can be identified more quickly.

In a possible implementation, the application type includes: a game-type application, an e-book-type application, a video-type application, a map-type application, or a sports-type application.

In a possible implementation, an identification feature of the game-type application includes: during running, the application is in a full-screen mode and an acceleration sensor or a gyroscope sensor are used for detection; or during running, the application is in a full-screen mode and it is detected by using a distance sensor that a distance between the user and the terminal in a first time length is kept not greater than a first threshold: or during running, the application is in a full-screen mode, and it is determined by using data collected by a pressure sensor that a quantity of times of tapping a screen by the user in the first time length is greater than a second threshold and utilization of a graphics processing unit GPU in the first time length is greater than a third threshold. According to this implementation, whether an application is the game-type application may be identified based on dynamic features of the game-type application. The dynamic features of the game-type application include a full-screen mode, relatively high GPU consumption, frequent taps by a user by using fingers on the screen in a short period of time, and a relatively short distance between the user and the terminal kept in a particular period of time. Therefore, whether the application is the game-type application can be accurately identified depending on whether the application meets one or more dynamic features of the game-type application.

In a possible implementation, an identification feature of the e-book-type application includes: the application is capable of parsing a text file; or during running, the application is in a full-screen mode and it is detected by using a distance sensor that a distance between the user and the terminal in a second time length is kept not greater than a fourth threshold. According to this implementation, whether an application is the e-book-type application may be identified in combination with a static feature and/or dynamic features of the e-book-type application. The static feature of the e-book-type application includes that the application is capable of parsing a text file, and the dynamic features of the e-book-type application include a full-screen mode, and a relatively short distance kept between the user and the terminal in a particular period of time. Therefore, whether the application is the e-book-type application can be accurately identified depending on whether the application meets the static feature of the e-book-type application and/or one or more of the dynamic features of the e-book-type application.

In a possible implementation, an identification feature of the video-type application includes: the application is capable of parsing a video file: or during running, the application is in a full-screen mode, audio is played, and it is detected by using a distance sensor that a distance between the user and the terminal in a third time length is kept not greater than a fifth threshold. According to this implementation, whether an application is the video-type application is identified in combination with a static feature and/or dynamic features of the e-book-type application. The static feature of the video-type application includes that the application is capable of parsing a video file, and the dynamic features of the video-type application include a full-screen mode, audio playing, and a relatively short distance kept between the user and the terminal in a particular period of time. Therefore, whether the application is the video-type application can be accurately identified depending on whether the application meets the static feature of the video-type application and/or one or more of the dynamic features of the video-type application.

In a possible implementation, an identification feature of the map-type application includes: the application is capable of parsing geographical location coordinate data; or during running, the application uses a global positioning system (Global Positioning System, GPS) for positioning. According to this implementation, whether an application is the map-type application is identified in combination with a static feature and/or a dynamic feature of the map-type application. The static feature of the map-type application includes that the application is capable of parsing the geographical location coordinate data, and the dynamic feature of the map-type application includes using the GPS for positioning. Therefore, whether the application is the map-type application can be accurately identified depending on whether the application meets the static feature of the map-type application and/or the dynamic feature of the map-type application.

In a possible implementation, an identification feature of the sports-type application includes: the application uses a direction sensor in a fourth time length. According to this implementation, whether an application is the sports-type application can be identified based on a dynamic feature of the sports-type application. The dynamic feature of the sports-type application includes using a direction sensor. Therefore, whether the application is the sports-type application can be accurately identified depending on whether the application meets the dynamic feature of the sports-type application.

In a possible implementation, before the terminal receives the indication information about creating or updating a folder, the terminal receives information that is pushed by a cloud and that is about application types of some applications in the at least one application: the terminal determines an application type of another application in the at least one application expect the some applications; and the terminal reports the application type of the another application to the cloud. According to this implementation, a folder may include an application whose application type is not stored in the cloud. In this case, the application type of the application included in the folder can be determined in combination with cloud pushing and automatic identification of the terminal, so that a name of the folder is recommended to a user based on the application type of the application.

According to another aspect, an embodiment of the present invention provides a terminal, the terminal can implement functions performed in the method designs in the first aspect, and the functions may be implemented by hardware, or may be implemented by hardware by executing corresponding software. The hardware or software includes one or more modules corresponding to the functions.

In a possible design, a structure of the terminal includes a processor, and the processor is configured to support the terminal in performing corresponding functions in the method in the first aspect. The terminal may further include an input unit, and the input unit is configured to receive indication information input by a user. The terminal may further include a display unit, and the display unit is configured to display at least one recommended name for a folder. The terminal may further include a memory, and the memory is configured to be coupled to the processor, where the memory stores a program instruction and data that are necessary for the terminal.

According to another aspect, an embodiment of the present invention provides a chip, the chip can be configured in a terminal, and the chip includes a processor and an interface. The processor is configured to support the chip in performing corresponding functions in the method in the first aspect. The interface is configured to support the chip in communicating with another chip or another network element. The chip may further include a memory, where the memory is configured to be coupled to the processor, and the memory stores a program instruction and data that are necessary for the chip.

According to still another aspect, an embodiment of the present invention provides a computer storage medium, configured to store a computer software instruction used by the foregoing terminal, and the computer software instruction includes a program designed for performing the first aspect.

According to still another aspect, an embodiment of the present invention provides a computer program product that includes an instruction, and when the program is performed by a computer, the instruction enables the computer to perform the functions that are performed by the terminal in the method design in the first aspect.

DESCRIPTION OF EMBODIMENTS

In a typical application scenario in embodiments of the present invention, a user tends to manually drag a plurality of applications into a same folder. In this case, to finish naming of the folder quickly and reasonably is needed. The plurality of applications may be a plurality of applications that have a same or similar application type. A process in which the user drags the plurality of applications into the same folder is or is close to a process of classification, so that an application type of an application becomes an important naming feature.

In a possible implementation, the application type includes: a game-type application, an e-book-type application, a video-type application, a map-type application, or a sports-type application.

The present invention is aimed at providing the foregoing functions. In the embodiments of the present invention, an application type-based folder naming rule and convenient UI interaction process are provided, to improve efficiency of managing a plurality of applications by a user, and further improve interface interaction friendliness of a terminal. In addition, to ensure accuracy of application type information, the embodiments of the present invention may adopt one or more of the following methods to identify an application type of an application: (1) a method for identifying a static feature; (2) a method for identifying a dynamic feature: (3) a method for identifying a combination of a static feature and a dynamic feature: (4) an identification method for cloud pushing; (5) an identification method for a combination of a static feature and cloud pushing; (6) an identification method for a combination of a dynamic feature and cloud pushing; (7) an identification method for a combination of a static feature, a dynamic feature, and cloud pushing.

The static feature may be determined based on information in an application configuration file, and the information in the application configuration file may be queried by using a specific method: and the dynamic feature may be determined based on data collected during running of an application, for example, the dynamic feature may be determined based on information about different types of sensors. For example, the information about the sensors may be types of sensors used in an application running process and/or data collected by sensors used in an application running process.

In the embodiments of the present invention, the terminal uses the information in the application configuration file as a static feature, data that is exchanged between a user and a mobile phone and that is collected by using a plurality of sensors such as a gravity sensor, a distance sensor, and an electronic compass, as a dynamic feature to identify an application type, and adopts a combination of static and dynamic features to identify the application type; when connected to a network, the terminal may further obtain application type information stored in a cloud from the cloud.

Figure 1:
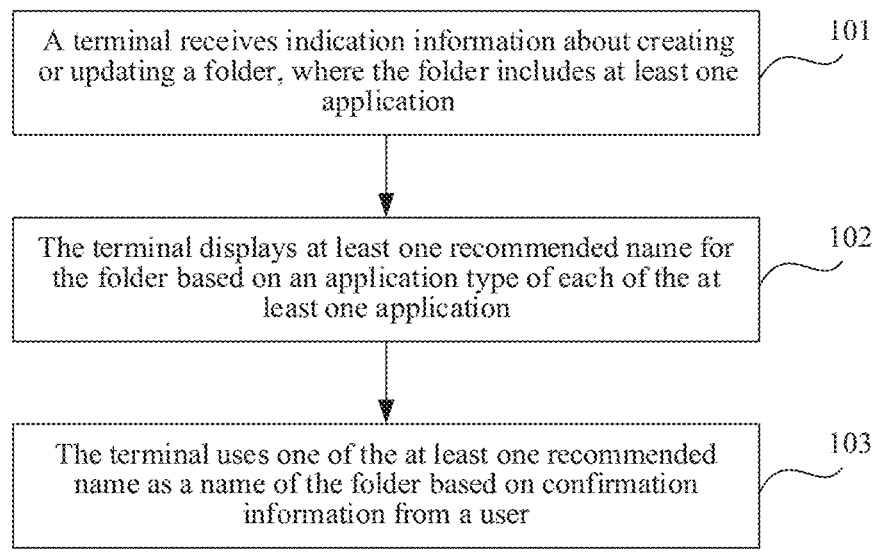
FIG. 1 is a flowchart of a method for naming a folder according to an embodiment of the present invention.

FIG. 1 is a flowchart of a method for naming a folder according to an embodiment of the present invention. An application type of an application can be identified by using any one of methods (1) to (7), and the method includes the following steps.

Step 101. A terminal receives indication information about creating or updating a folder, where the folder includes at least one application.

The terminal may be a mobile phone, a tablet, or another terminal that has a function of creating a folder, and the folder may include only one application, or may include two or three applications or more applications.

For example, in a scenario of creating a folder, a user manually drags a plurality of applications into a same folder. For example, in a scenario of updating a folder, when a user first creates a folder, the folder includes an application A and an application B, and then the user adds an application C to the folder. Such a scenario of adding an application to a folder or deleting an application from a folder may trigger updating of the folder. In another scenario of updating a folder, when at least one application in the folder is updated, updating of the folder may also be triggered.

Step 102. The terminal displays at least one recommended name for the folder based on an application type of each of the at least one application.

For example, if the folder includes two applications, and the two applications are of a same application type, only one recommended name may be generated for the folder. For another example, if the folder includes two applications, and the two applications are of different application types, only one recommended name may be generated for the folder, or two recommended names may be generated for the folder.

In an example, the terminal can not only identify an application type of an application when installing the application, but also identify the application type of the application when updating the application. It should be noted that updating of the application may cause changes in the application type of the application. For example, an application is a game-type application before updating, but is more suitable to be classified as a sports-type application after updating because a new function is added. Correspondingly, re-identifying an application type of the application after the application is updated makes naming a folder more reasonable.

In an example, identification of an application type of an application may be triggered by the user. For example, when the user touches and holds an application icon of an application, an option of identifying the application type of the application is displayed, and when the user selects the option, the terminal identifies the application type of the application.

Step 103. The terminal uses one of the at least one recommended name as a name of the folder based on confirmation information from a user.

For example, in step 102, the terminal displays two recommended names for the folder, so that the user may select one recommended name as the name of the folder based on preference of the user. In addition, the terminal may also display an option of User-define, and when all recommended names do not meet the preference of the user, the user may name the folder through the option of User-define.

Figure 2:
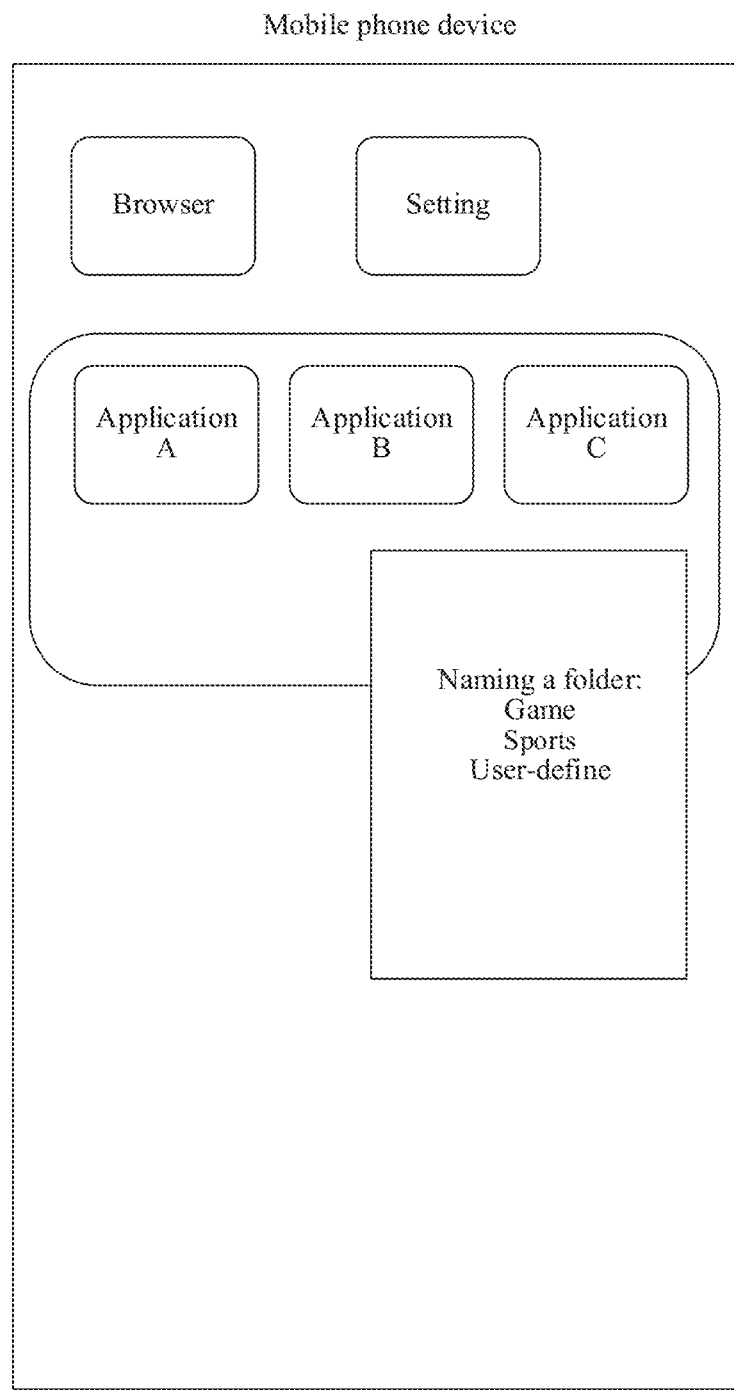
FIG. 2 is a schematic diagram of a UI interaction interface for naming a folder in a mobile phone device according to an embodiment of the present invention.
Figure 3:
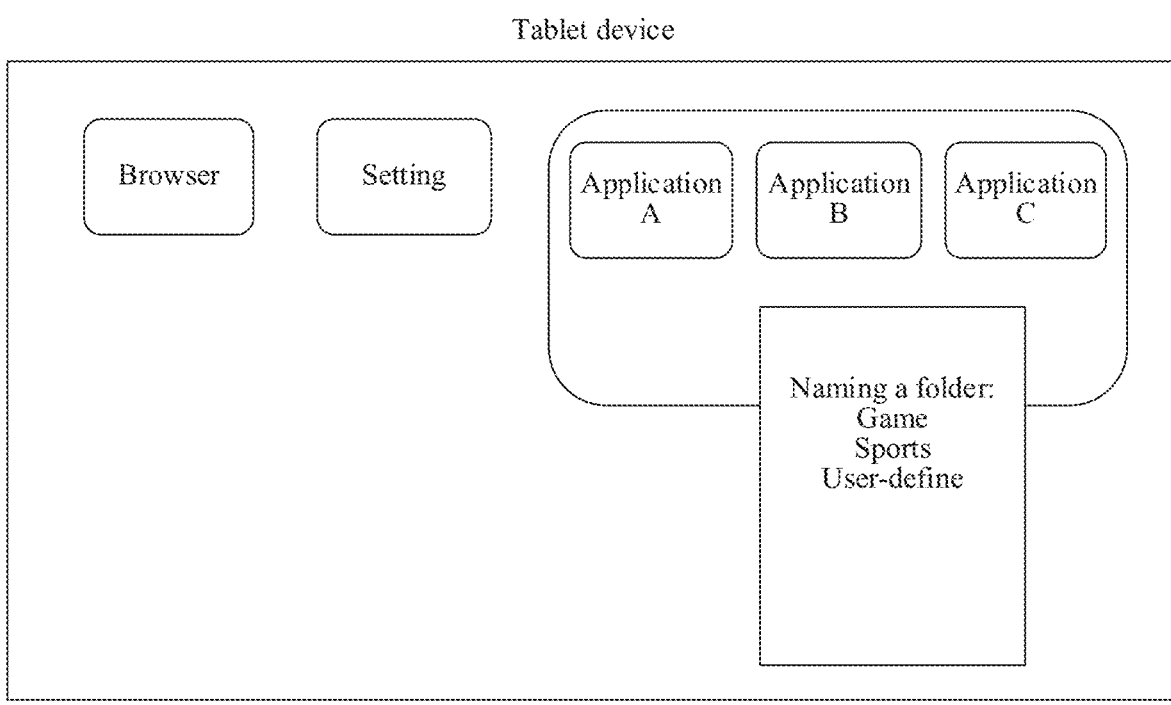
FIG. 3 is a schematic diagram of a UI interaction interface for naming a folder in a tablet device according to an embodiment of the present invention.

When application type information has been identified, a UI interface of the terminal may be as shown in FIG. 2 or FIG. 3. FIG. 2 is a schematic diagram of a UI interaction interface for naming a folder in a mobile phone device according to an embodiment of the present invention, and FIG. 3 is a schematic diagram of a UI interaction interface for naming a folder in a tablet device according to an embodiment of the present invention. The UI interface can provide concise and convenient folder naming experience for the user. The UI interfaces shown in FIG. 2 and FIG. 3 include same content, and only a specific position of an icon differs. To avoid repetition, descriptions are made by using only an example of FIG. 2. Referring to FIG. 2, a folder newly created by a user includes three applications, an application A, an application B and an application C. The terminal identifies the application A and application B as game-type applications, and the application C as a sports-type application. Therefore, there are three options displayed in a pull-down list for naming the folder: game, sports, and user-define. Game and sports are recommended name, the user may select one of the two recommended names and indicates the recommended name to the terminal, and the terminal uses the recommended name selected by the user as a name of the folder after receiving the indication information from the user; or the user may select the option of user-define, and input a combination of words and/or symbols based on the preference of the user, and the terminal uses the combination of words and/or symbols as the name of the folder after receiving the input information from the user. For brevity, when the user drags a plurality of applications into a same folder, the interface pops up a pull-down list, based on an application type that has been identified, for the user to select from. If not satisfied with the name, the user can alternatively select a user-defining manner to manually input the name of the folder. Therefore, under the premise that the application type is already identified by the terminal, a concise UI interface interaction manner is provided, which is convenient for the user to name a folder.

In this embodiment of the present invention, the terminal usually determines an application type of each application in the terminal before step 101. However, certainly, it is also possible that the application type of each application included in a newly created folder may be determined after step 101.

The terminal may determine the application type of each application in at least one of the following manners: receiving, by the terminal, information that is pushed by a cloud and that is about the application type of each of the at least one application; querying, by the terminal, information in an application configuration file, and determining the application type of the application based on the information in the application configuration file; and/or determining, by the terminal, the application type of the application based on information about a sensor used in an application running process. The cloud may also be referred to as a cloud platform.

Figure 4:
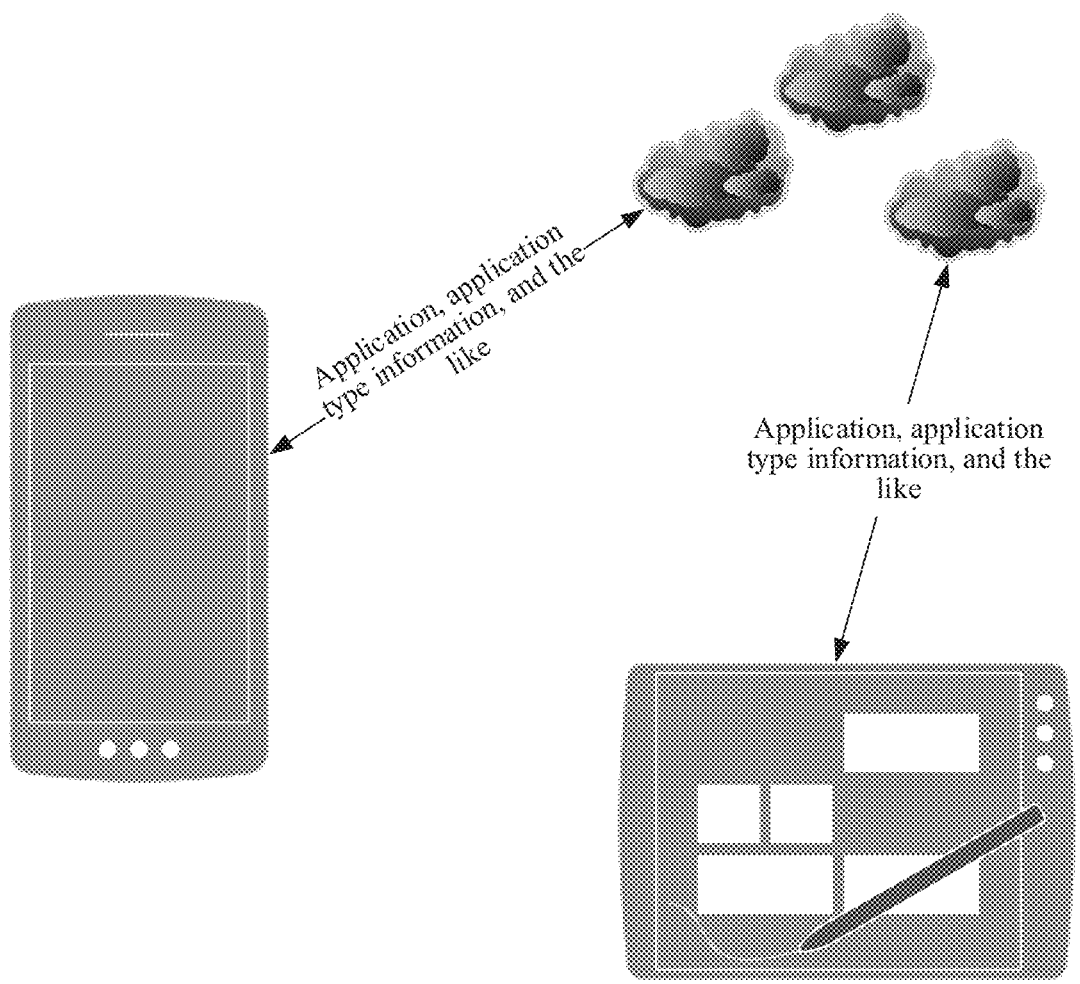
FIG. 4 is a schematic diagram of a system architecture of application information pushed by a cloud according to an embodiment of the present invention.

FIG. 4 is a schematic diagram of a system architecture of application information pushed by a cloud according to an embodiment of the present invention. When connected to a network, a terminal pushes application type information over the cloud. In an example, an application management data warehouse is set up in the cloud, and application management data warehouse is used to store various applications and type information thereof, and to provide a query interface for the outside.

It should be understood that when the terminal includes an application while the cloud does not store an application type of the application, the terminal may determine the application type of the application, and optionally, the terminal may further report the determined application type of the application to the cloud, so that other terminals can obtain information about the application type of the application, or further enrich or update application type information in the cloud, to make the application type information in the cloud more accurate. Alternatively, when the terminal includes an application and the cloud stores an application type of the application, the terminal may determine the application type of the application.

In an example, the terminal identifies and determines an application type based on a static feature of an application. In this manner, the application type of the application can be identified quickly, and the terminal does not need to be connected to a network.

In another example, the terminal identifies and determines an application type based on application type information of an application obtained from the cloud. In this manner, the terminal can directly read the application type information of the application, thereby saving processing resources of the terminal.

In another example, the terminal identifies and determines an application type based on a dynamic feature of an application. In this manner, the application type of the application can be identified in a relatively accurate way, and the terminal does not need to be connected to a network.

In this embodiment of the present invention, an application type of an application may be further identified with a combination of any two or all of the foregoing three manners. For example, when the foregoing two manners are adopted to identify the application type of the application, it may be set that when application types identified in the two manners are consistent, the consistent application type is determined as the application type of the application; or when the foregoing three manners are adopted to identify the application type of the application, it can be set that when application types identified in any two manners are consistent, the consistent application type may be determined as the application type of the application. In this way, the application type of the application can be identified more accurately through a combination of a plurality of manners.

In still another example, an application type of an application may be first identified based on a static feature of the application; and when the application type of the application cannot be identified based on the static feature of the application, a dynamic feature of the application is used for identification, or a combination of a static feature and a dynamic feature of the application is used for identification, so that a probability of successful identification and an accuracy rate of application type identification can be improved.

A dynamic feature of an application may be determined based on data collected by a sensor during running of the application. When using different applications in the daily life, a user usually interacts with different types of sensors. For example, a user enables a fitness application to count steps by using a direction sensor during running, uses a map-type application during navigation and completes positioning by using a global positioning system (Global Positioning System. GPS), usually uses a distance sensor when playing a game, and the like.

Based on an analysis of existing application types, it is found that application types that need to be dynamically identified with reference to sensors include: a game-type application, an e-book-type application, a video-type application, a map-type application and a sports-type application. Identification features of different types of applications are shown in Table 1.

In this embodiment of the present invention, each application type has a corresponding identification feature: and if detecting that a feature in an application running process matches a preset identification feature of a first application type, the terminal determines that the application type of the application is the first application type, and the preset identification feature of the first application type includes the information about the sensor.

In an example, an identification feature of the game-type application includes: during running, the application is in a full-screen mode and an acceleration sensor or a gyroscope sensor are used for detection; or during running, the application is in a full-screen mode and it is detected by using a distance sensor that a distance between the user and the terminal in a first time length is kept not greater than a first threshold; or during running, the application is in a full-screen mode, and it is determined by using data collected by a pressure sensor that a quantity of times of tapping a screen by the user in the first time length is greater than a second threshold and utilization of a GPU in the first time length is greater than a third threshold.

In an example, an identification feature of the e-book-type application includes: the application is capable of parsing a text file: or during running, the application is in a full-screen mode and it is detected by using a distance sensor that a distance between the user and the terminal in a second time length is kept not greater than a fourth threshold.

In an example, an identification feature of the video-type application includes: the application is capable of parsing a

TABLE 1

| Application type | Static feature | Dynamic feature | Sensor that needs to be used during identification of an application type |
|---|---|---|---|
| Game-type application | Null | Full-screen mode, relatively high consumption of a graphics processing unit (Graphics Processing Unit. GPU), frequent taps by a user by using fingers on a screen in a short period of time, and relatively short distance kept between a user and a mobile phone in a particular period of time | Pressure sensor, distance sensor, accelerator sensor, and gyroscope sensor |
| E-book-type application | An application is capable of parsing files that include types of text/plain, text/html, and application/eupb + zip | Full-screen mode, and relatively short distance kept between a user and a mobile phone in a particular period of time | Pressure sensor, and distance sensor |
| Video-type application | An application is capable of parsing a video-type file | Full-screen mode, audio playing, and relatively short distance kept between a user and a mobile phone in a particular period of time | Pressure sensor, and distance sensor |
| Map-type application | An application is capable of parsing geographical location coordinate data | Using a GPS for positioning | GPS, and direction sensor |
| Sports-type application | Not having | Using a direction sensor | Direction sensor | video file: or during running, the application is in a full-screen mode, audio is played, and it is detected by using a distance sensor that a distance between the user and the terminal in a third time length is kept not greater than a fifth threshold.

In an example, an identification feature of the map-type application includes: the application is capable of parsing geographical location coordinate data; or during running, the application uses a GPS for positioning.

In an example, an identification feature of the sports-type application includes: the application uses a direction sensor in a fourth time length.

In an example, before the terminal receives indication information about creating or updating a folder, the terminal receives information that is pushed by a cloud and that is about application types of some applications in the at least one application; the terminal determines an application type of another application in the at least one application expect the some applications; and the terminal reports the application type of the another application to the cloud.

With reference to the foregoing identification feature of each application type, in this embodiment of the present invention, each application type may have a corresponding identification flowchart. An application type of an application may be identified after the application is installed or after the application is updated, or a user may also trigger identification of the application type of the application. In an example, when the application type of the application cannot be determined based on the information in the application configuration file, the identification flowchart of each application type is adopted based on a priority of the application type, to check one by one whether the application type is matched until the matched application type is found, and the matched application type is determined as the application type of the application. The identification flowchart of each application type uses the data reported by the sensor used in the application running process.

In a possible implementation, the application type includes: the game-type application, the e-book-type application, the video-type application, the map-type application, or the sports-type application. The following separately describes a flowchart of identifying each application type.

Figure 5:
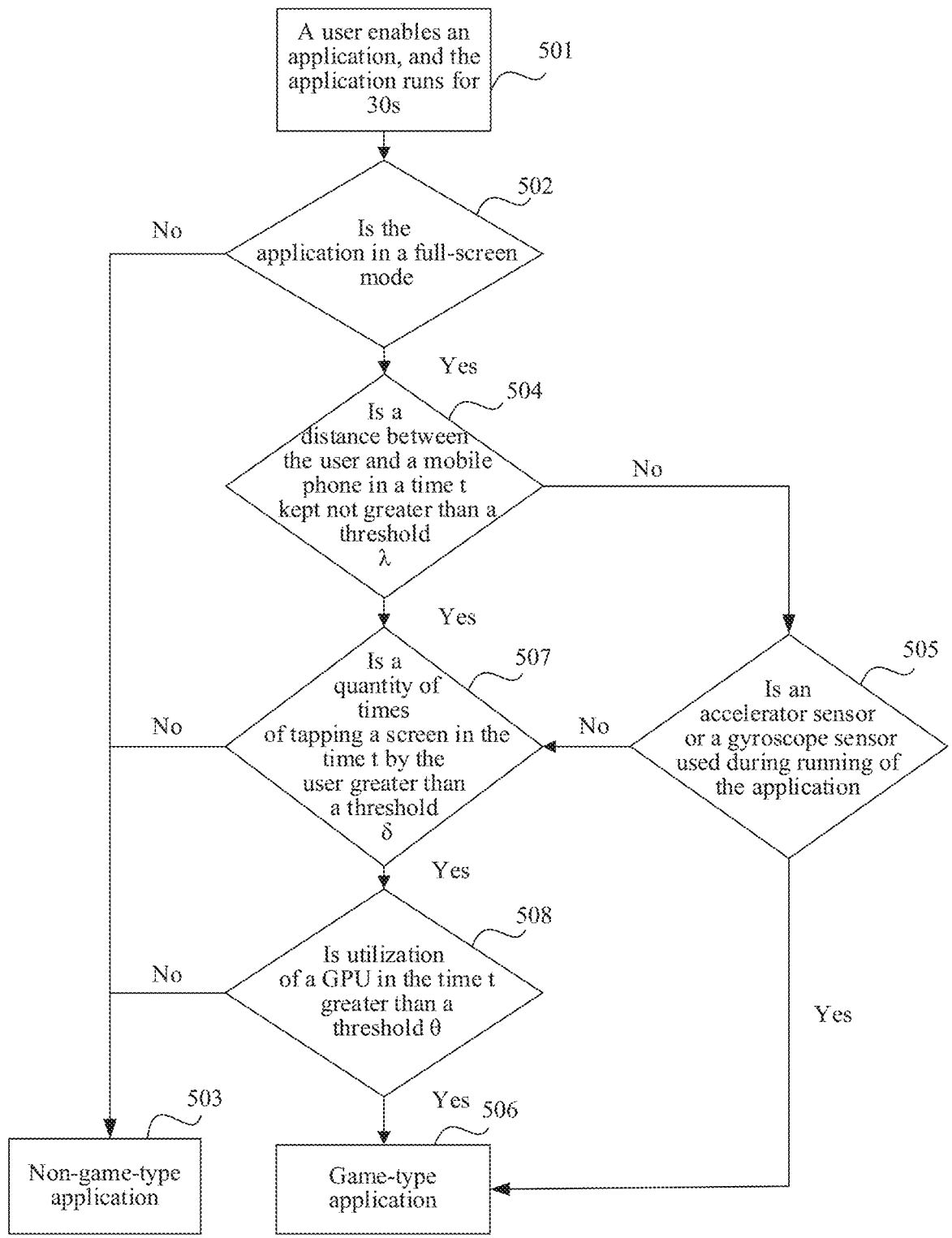
FIG. 5 is a flowchart of a method for identifying a game-type application according to an embodiment of the present invention.

FIG. 5 is a flowchart of a method for identifying a game-type application according to an embodiment of the present invention, and the method includes:

Step 501. Determine that an application running time exceeds a first time length.

The first time length may be set based on a policy, for example, set to 30 s. Step 501 may avoid waste of processing resources caused by identifying an application type in an excessively short application running time.

Step 502. Determine whether an application is in a full-screen mode.

When it is determined that the application is not in the full-screen mode, step 503 is performed; or when it is determined that the application is in the full-screen mode, step 504 is performed.

Step 503. Determine that the application is a non-game-type application.

Step 504. Determine whether a distance between a user and a terminal in a second time length is kept not greater than a first threshold.

The second time length may be represented by t, the terminal may be a mobile phone, and the distance between the user and the mobile phone may be measured by using a distance sensor, and the first threshold may be determined based on a statistical result, and may be denoted as $\lambda$.

When it is determined that the distance kept between the user and the terminal in the second time length is greater than the first threshold, step 505 is performed: and when it is determined that the distance between the user and the terminal in the second time length is kept not greater than the first threshold, step 507 is performed.

Step 505. Determine whether an accelerator sensor or a gyroscope sensor is used during running of the application.

When it is determined that the accelerator sensor or the gyroscope sensor is used during running of the application, step 506 is performed; and when it is determined that neither the accelerator sensor nor the gyroscope sensor is used during running of the application, step 507 is performed.

Step 506. Determine that the application is a game-type application.

Step 507. Determine whether a quantity of times of tapping a screen by the user in the second time length is greater than a second threshold.

The second threshold may be denoted as $\delta$, and a pressure sensor may be used to measure the quantity of times of tapping a mobile phone screen by the user.

When it is determined that the quantity of times of tapping a screen by the user in the second time length is not greater than the second threshold, step 503 is performed; or when it is determined that the quantity of times of tapping a screen by the user in the second time length is greater than the second threshold, step 508 is performed.

Step 508. Determine whether utilization of a graphics processing unit GPU in the second time length is greater than a third threshold.

The third threshold may be denoted as $\theta$.

When it is determined that the utilization of the GPU in the second time length is not greater than the third threshold, step 503 is performed; or when it is determined that the utilization of the GPU in the second time length is greater than the third threshold, step 506 is performed.

In a process of identifying a game-type application, situations in which a sensor (sensor) is used include: measuring the distance between the user and the mobile phone by using the distance sensor; measuring the quantity of times of tapping a mobile phone screen by the user by using the pressure sensor; and using the accelerator sensor or the gyroscope sensor during running of the application.

Figure 6:
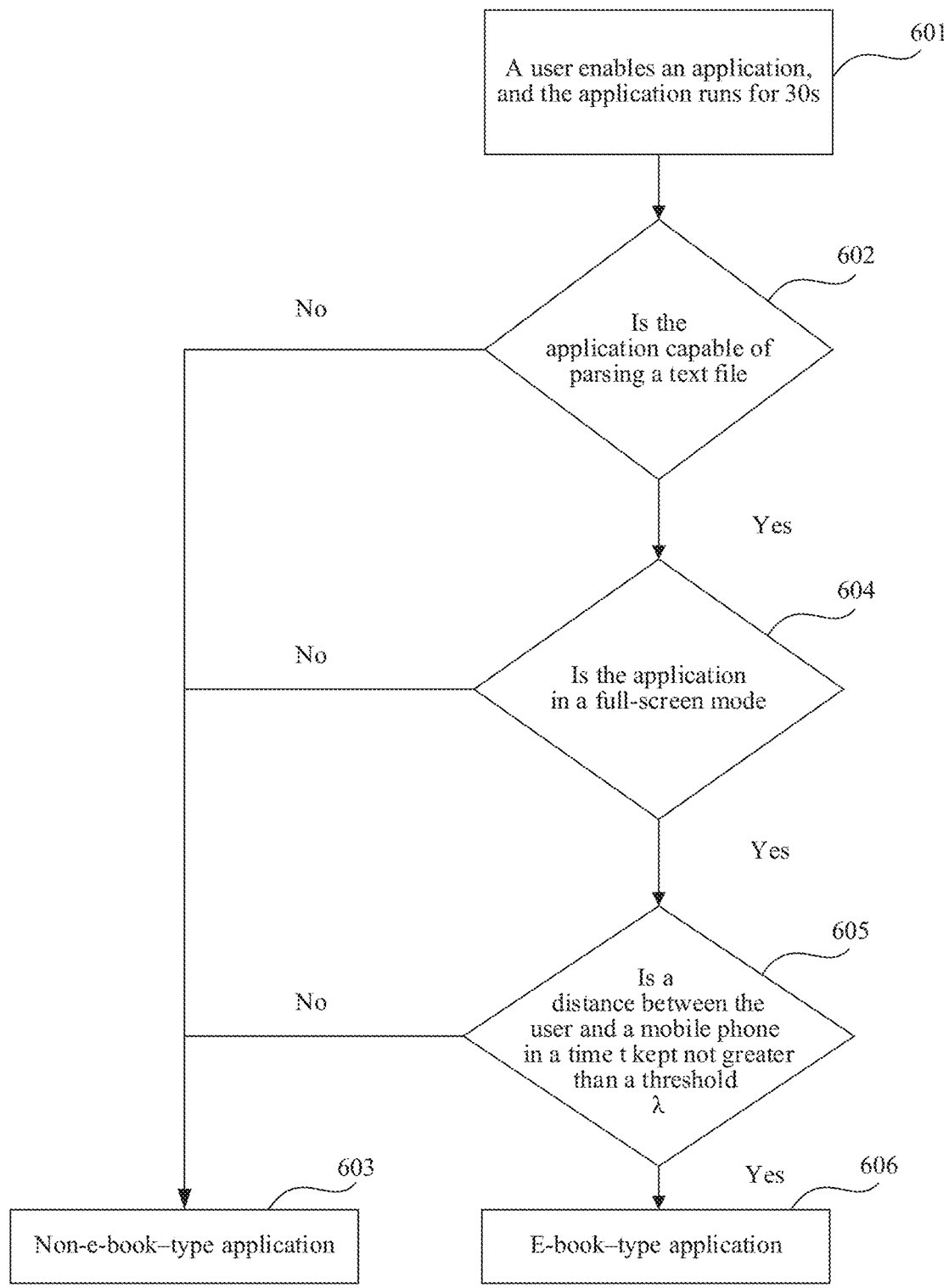
FIG. 6 is a flowchart of a method for identifying an e-book-type application according to an embodiment of the present invention.

FIG. 6 is a flowchart of a method for identifying an e-book-type application according to an embodiment of the present invention. A distance sensor needs to be used to measure a distance between a user and a terminal (for example, a mobile phone) in an identification process, and the method includes the following steps:

Step 601. Determine that an application running time exceeds a third time length.

The third time length may be set based on a policy, for example, set to 30 s. Step 601 may avoid waste of processing resources caused by identifying an application type in an excessively short application running time.

Step 602. Determine whether an application is capable of parsing a text file.

In an example, whether the application is capable of parsing the text file may be determined based on information in an application configuration file.

When it is determined that the application is not capable of parsing the text file, step 603 is performed; and when it is determined that the application is capable of parsing the text file, step 604 is performed.

Step 603. Determine that the application is a non-e-book-type application.

Step 604. Determine whether the application is in a full-screen mode.

When it is determined that the application is not in the full-screen mode, step 603 is performed; and when it is determined that the application is in the full-screen mode, step 605 is performed.

Step 605. Determine whether a distance between a user and a terminal in a fourth time length is kept not greater than a fourth threshold.

The fourth time length may be represented by t, the terminal may be a mobile phone, and the distance sensor may be used to measure the distance between the user and the mobile phone, and the fourth threshold may be determined based on a statistical result, and may be denoted as λ.

When it is determined that the distance kept between the user and the terminal in the fourth time length is greater than the fourth threshold, step 603 is performed; and when it is determined that the distance between the user and the terminal in the fourth time length is kept not greater than the fourth threshold, step 606 is performed.

Step 606. Determine that the application is an e-book-type application.

Figure 7:
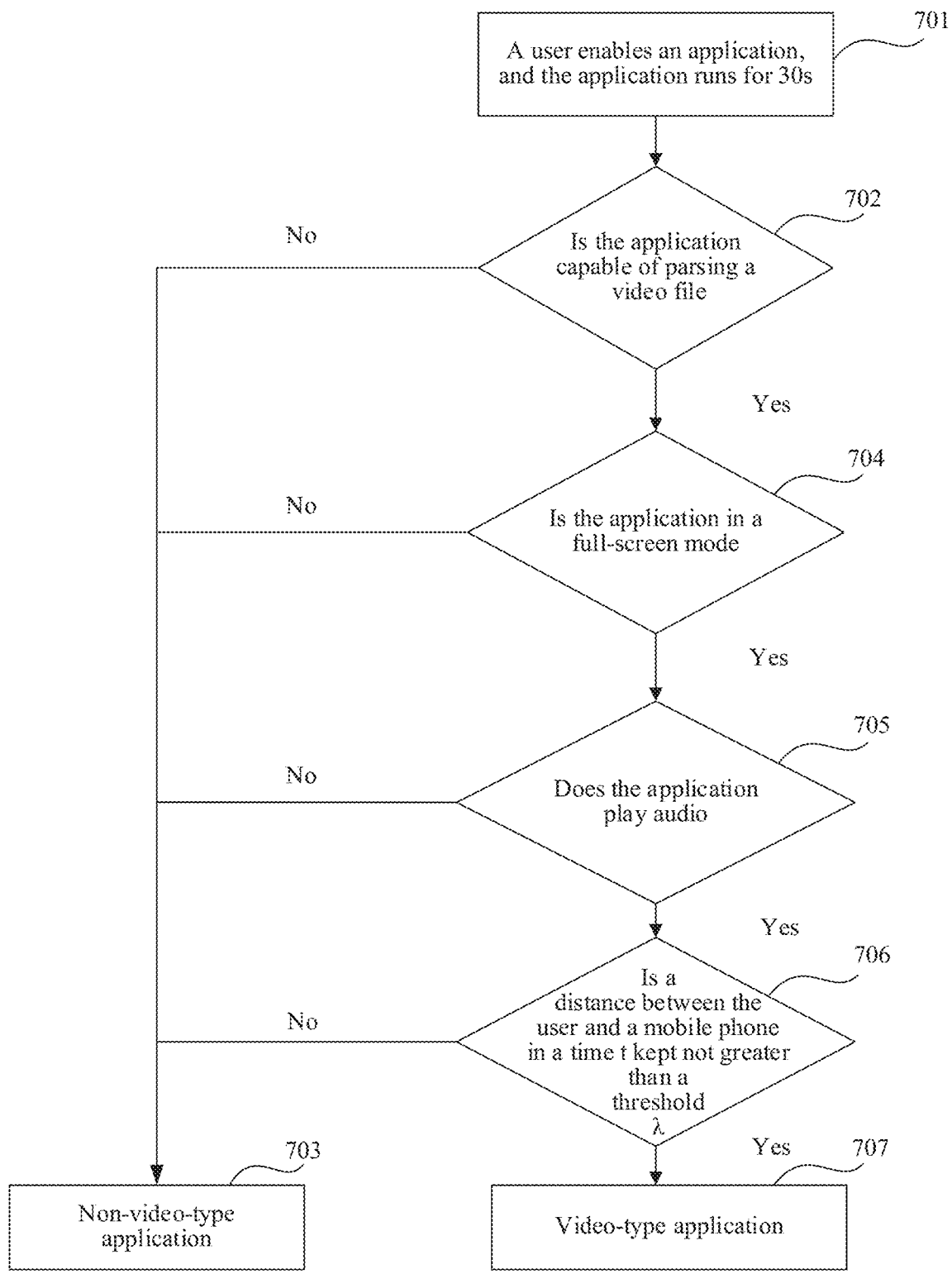
FIG. 7 is a flowchart of a method for identifying a video-type application according to an embodiment of the present invention.

FIG. 7 is a flowchart of a method for identifying a video-type application according to an embodiment of the present invention. In a running process, the video-type application has features of a full-screen mode and audio playing. Whether an application is the video-type application may be identified based on the features and a distance measured by using a distance sensor. The method includes the following steps.

Step 701. Determine that an application running time exceeds a fifth time length.

The fifth time length may be set based on a policy, for example, set to 30 s. Step 701 may avoid waste of processing resources caused by identifying an application type in an excessively short application running time.

Step 702. Determine whether an application is capable of parsing a video file.

The video file may be a video-type file. Whether the application is capable of parsing the video file may be determined based on information in the application configuration file.

When it is determined that the application is not capable of parsing the video file, step 703 is performed; and when it is determined that the application is capable of parsing the video file, step 704 is performed.

Step 703. Determine that the application is a non-video-type application.

Step 704. Determine whether the application is in a full-screen mode.

When it is determined that the application is not in the full-screen mode, step 703 is performed; or when it is determined that the application is in the full-screen mode, step 705 is performed.

Step 705. Determine whether the application plays audio.

When it is determined that the application does not play audio, step 703 is performed; or when it is determined that the application plays audio, step 706 is performed.

Step 706. Determine whether a distance kept between a user and a terminal in a sixth time length is not greater than a fifth threshold.

The sixth time length may be represented by t, the terminal may be a mobile phone, and the distance between the user and the mobile phone may be measured by using a distance sensor, and the fifth threshold may be determined based on a statistical result, and may be denoted as λ.

When it is determined that the distance kept between the user and the terminal in the sixth time length is greater than the fifth threshold, step 703 is performed; or when it is determined that the distance between the user and the terminal in the sixth time length is kept not greater than the fifth threshold, step 707 is performed.

Step 707. Determine that the application is a video-type application.

Figure 8:
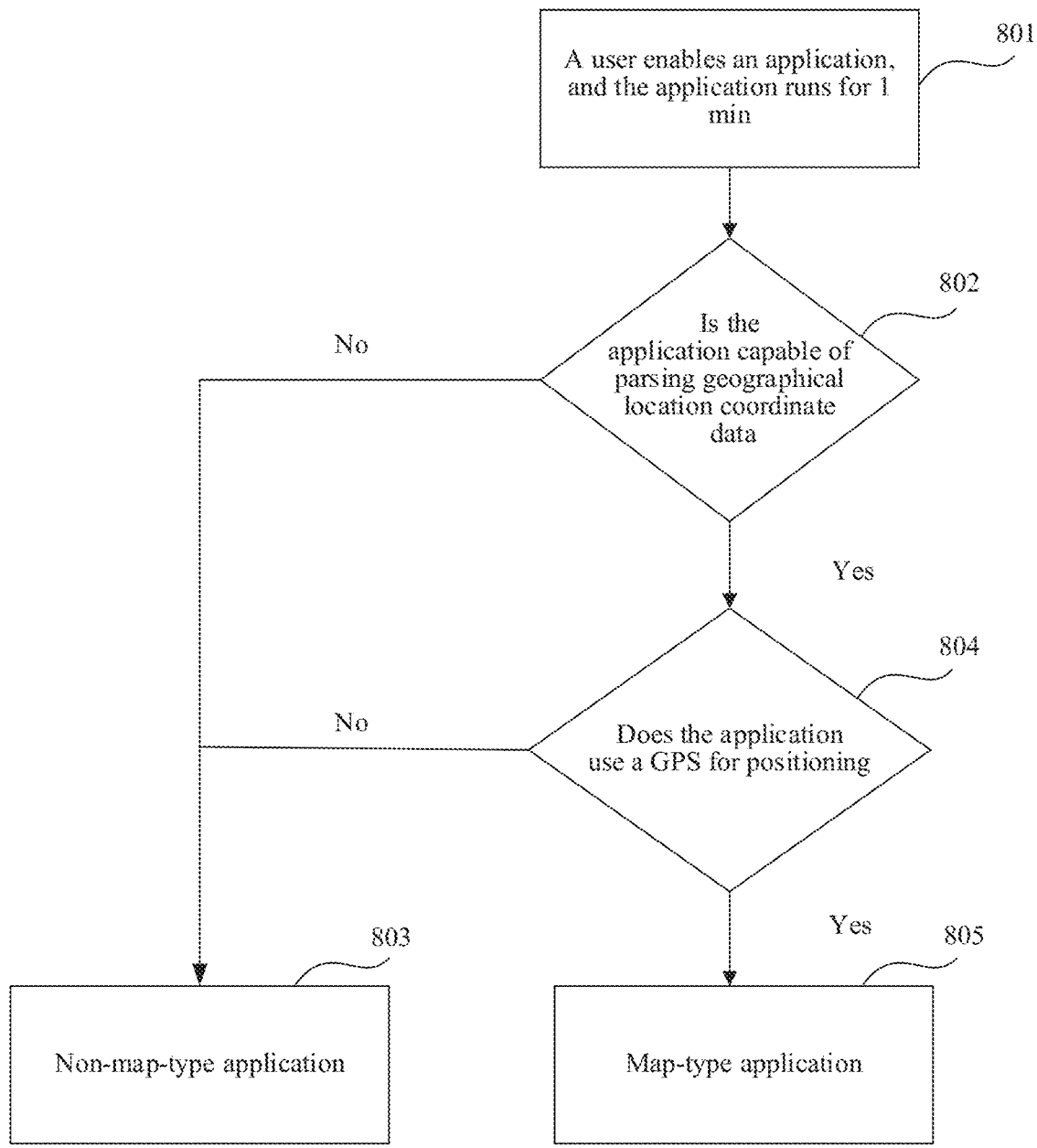
FIG. 8 is a flowchart of a method for identifying a map-type application according to an embodiment of the present invention.

FIG. 8 is a flowchart of a method for identifying a map-type application according to an embodiment of the present invention. Features of a map-type application apparently differ from those of other applications. Whether an application is the map-type application may be identified based on only types of parsed data and a situation of using a GPS. The method includes the following steps:

Step 801. Determine that an application running time exceeds a seventh time length.

The seventh time length may be set based on a policy, for example, set to 1 min. Step 801 may avoid waste of processing resources caused by identifying an application type in an excessively short application running time.

Step 802. Determine whether an application is capable of parsing geographical location coordinate data.

In an example, whether the application is capable of parsing geographical location coordinate data may be determined based on information in an application configuration file.

When it is determined that the application is not capable of parsing the geographical location coordinate data, step 803 is performed; or when it is determined that the application is capable of parsing the geographical location coordinate data, step 804 is performed.

Step 803. Determine that the application is a non-map-type application.

Step 804. Determine whether the application uses a GPS for positioning.

When it is determined that the application does not use a GPS for positioning, step 803 is performed; or when it is determined that the application uses a GPS for positioning, step 805 is performed.

Step 805. Determine that the application is a map-type application.

Figure 9:
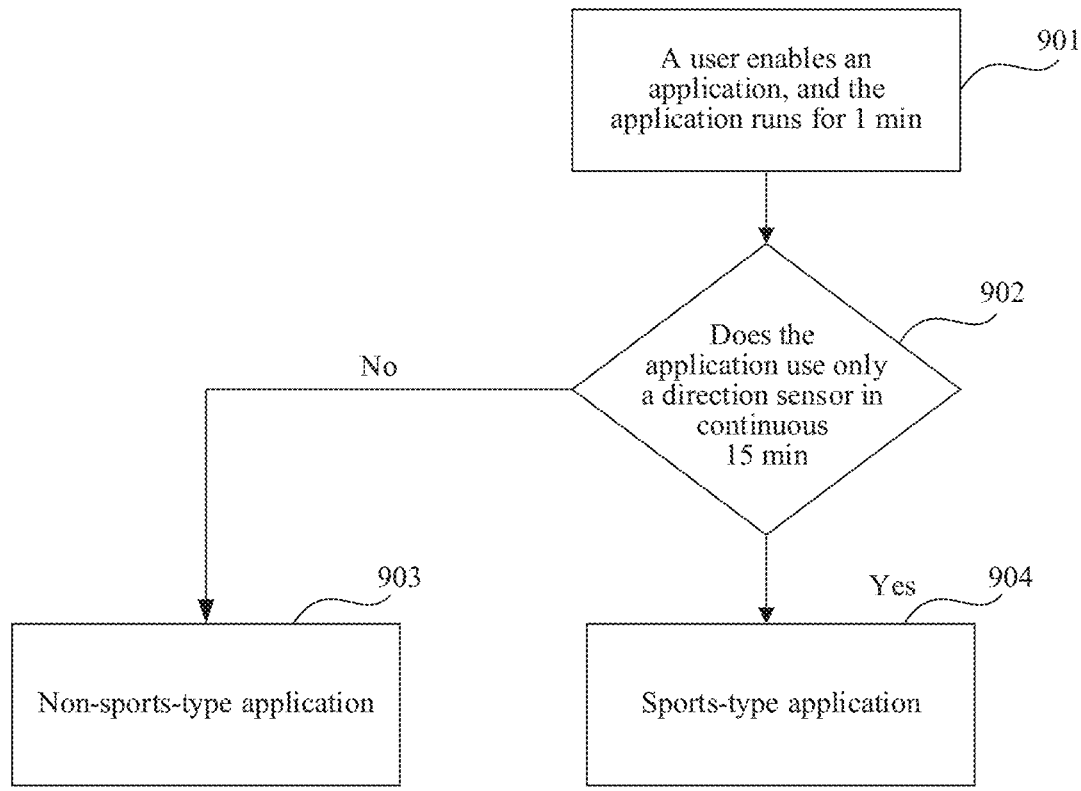
FIG. 9 is a flowchart of a method for identifying a sports-type application according to an embodiment of the present invention.

FIG. 9 is a flowchart of an identification method for a sports-type application according to an embodiment of the present invention. A general scenario in which a user uses a sports-type application is that after the sports-type application is enabled, the application continuously runs for a period of time and invokes a direction sensor to count steps. This is apparently different from other types of applications. The method includes the following steps:

Step 901. Determine that an application running time exceeds an eighth time length.

The eighth time length may be set based on a policy, for example, set to 1 min. Step 901 may avoid waste of processing resources caused by identifying an application type in an excessively short application running time.

Step 902. Determine whether an application uses only a direction sensor in a ninth time length.

When it is determined that the application does not use only a direction sensor in a ninth time length, step 903 is performed; or when it is determined that the application uses only a direction sensor in a ninth time length, step 904 is performed.

Step 903. Determine that the application is a non-sports-type application.

Step 904. Determine that the application is a sports-type application.

In an example, before receiving indication information about creating or updating a folder, a terminal determines an application type of each application in the terminal, and the terminal may use the following manners to determine the application type of each application: receiving, by the terminal, information that is pushed by a cloud and that is about application types of some of all applications in the terminal; querying, by the terminal, information in an application configuration file, and determining an application type of another application of all the applications in the terminal expect the some applications, determining the application type of the another application with reference to data reported by a sensor used in an application running process when the application type of the another application cannot be determined based on the information in the application configuration file: and reporting, by the terminal, the application type of the another application to the cloud.

In this embodiment of the present invention, application type information may be updated in real time in combination with the cloud. When the user downloads and installs an application from an official application market, application information may be pushed to a local terminal in real time through cloud pushing and may be updated in the local terminal, which prepares for intelligently naming a folder. Optionally, the application type information may further be obtained through local identification, and be synchronously updated to a cloud database, so that when another user installs the application, the another user may obtain the application information through cloud pushing. In such a manner in which a local end and a cloud are collaborated, real-time and accurate application information can be ensured.

Optionally, after a folder is set up, adding a new application to the folder may trigger renaming of the folder. A method for naming a folder when the folder is updated is similar to the method for naming a folder when the folder is created, during which a recommended name for the folder can be determined based on an application type of an application. It can be understood that if a folder includes an application A and an application B. and the application A and the application B are of a same application type, and when the user adds an application C that has the same application type as the application A and the application B to the folder, renaming of the folder does not need to be triggered; and if a folder includes an application A and an application B, the application A is of a first application type, and the application B is of a second application type, when the user adds another application C that is of the first application type to the folder, renaming of the folder may be triggered. That is, a change caused by updating of a folder in a proportion of application types of a plurality of applications in the folder may trigger renaming of the folder.

Figure 10:
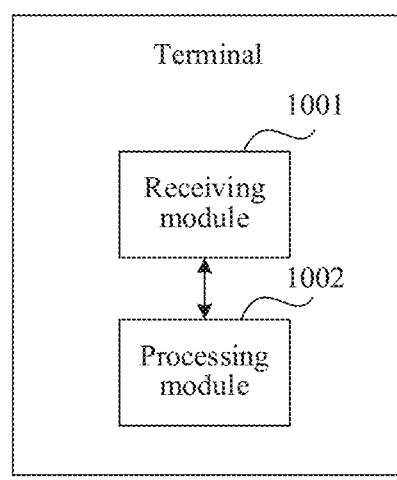
FIG. 10 is a structural schematic diagram of a terminal according to an embodiment of the present invention.

FIG. 10 is a structural schematic diagram of a terminal according to an embodiment of the present invention. The terminal is configured to perform the method for naming a folder provided in the embodiments of the present invention, and for corresponding features and descriptions, refer to the foregoing content related to the method, and details are not described in this embodiment. The terminal includes:

a receiving module 1001, configured to receive indication information about creating or updating a folder, where the folder includes at least one application; and a processing module 1002, configured to: display at least one recommended name for the folder based on an application type of each of the at least one application; and use one of the at least one recommended name as a name of the folder based on confirmation information from a user.

The processing module 1002 is configured to perform control management on an action of the terminal. For example, the processing module 1002 is configured to support the terminal in performing the processes in FIG. 1, and FIG. 5 to FIG. 9, and/or is used in other processes of technologies described in this specification. The receiving module 1001 is configured to support interaction between the terminal and the user or communication between the terminal and another network entity.

In an example, the processing module 1002 is further configured to: before the receiving module 1001 receives the indication information about creating or updating a folder, determine the application type of each of the at least one application in at least one of the following manners: receiving information that is pushed by a cloud and that is about the application type of each of the at least one application; querying information in an application configuration file, and determining the application type of the application based on the information in the application configuration file; and/or determining the application type of the application based on information about a sensor used in an application running process.

In an example, each application type has a corresponding identification feature: and the processing module 1002 performs the operation of determining the application type of the application based on information about a sensor used in an application running process, including: if detecting that a feature in the application running process matches a preset identification feature of a first application type, determining that the application type of the application is the first application type, and the preset identification feature of the first application type includes the information about the sensor.

In an example, an identification feature of the game-type application includes: during running, the application is in a full-screen mode and an acceleration sensor or a gyroscope sensor are used for detection; or when during running, the application is in a full-screen mode and it is detected by using a distance sensor that a distance between the user and the terminal in a first time length is kept not greater than a first threshold; or during running, the application is in a full-screen mode, and it is determined by using data collected by a pressure sensor that a quantity of times of tapping a screen by the user in the first time length is greater than a second threshold and utilization of a graphics processing unit GPU in the first time length is greater than a third threshold.

In an example, an identification feature of the e-book-type application includes: the application is capable of parsing a text file; or during running, the application is in a full-screen mode and it is detected by using a distance sensor that a distance between the user and the terminal in a second time length is kept not greater than a fourth threshold.

In an example, an identification feature of the video-type application includes: the application is capable of parsing a video file: or during running, the application is in a full-screen mode, audio is played, and it is detected by using a distance sensor that a distance between the user and the terminal in a third time length is kept not greater than a fifth threshold.

In an example, an identification feature of the map-type application includes: the application is capable of parsing geographical location coordinate data; or during running, the application uses a GPS for positioning.

In an example, an identification feature of the sports-type application includes: the application uses a direction sensor in a fourth time length.

In an example, the processing module 1002 is further configured to: before the receiving module 1001 receives the indication information about creating or updating a folder, receive information that is pushed by a cloud and that is about application types of some applications in the at least one application; determine an application type of another application in the at least one application expect the some applications; and report the application type of the another application to the cloud.

In this embodiment of the present invention, when the receiving module 1001 receives the indication information about creating or updating a folder, the processing module 1002 displays at least one recommended name for the folder based on an application type of an application included in the folder. The recommended names are determined based on the application type of the application, which is a new folder naming manner. The naming manner is relatively easy to meet a user requirement because of a reasonable naming rule. The user may select one of the recommended names as a name of the folder. It is convenient to operate and user experience is excellent.

Figure 11:
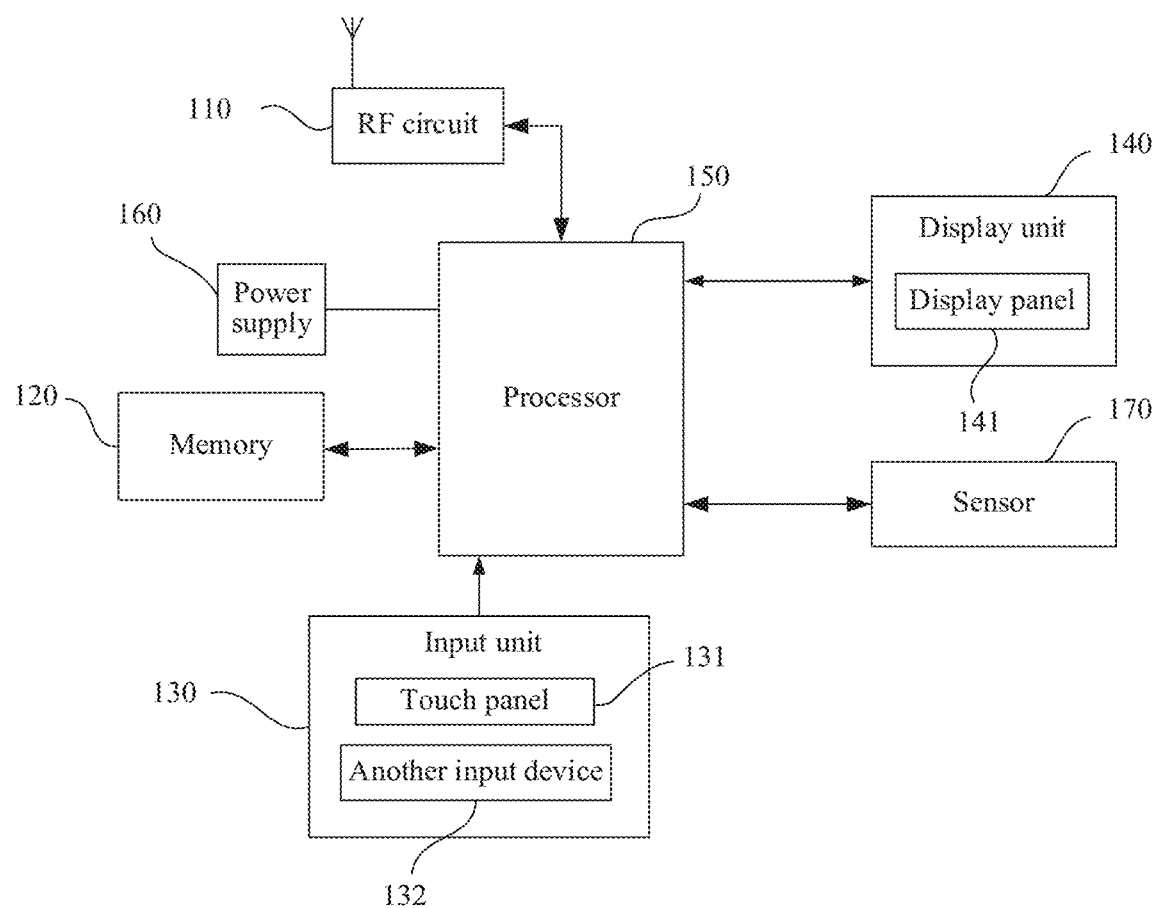
FIG. 11 is a structural schematic diagram of another terminal according to an embodiment of the present invention.

As shown in FIG. 11, a terminal provided by an embodiment of the present invention includes: components such as a radio frequency (English: Radio Frequency, RF) circuit 110, a memory 120, an input unit 130, a display unit 140, a processor 150, a power supply 160, and a sensor 170. A person skilled in the art may understand that the terminal structure shown in FIG. 11 is not intended to limit the terminal, and may include components more or less than those shown in the figure, or some components may be combined, or different component layouts may be used.

The terminal provided in this embodiment of the present invention may be used to perform the method for naming a folder provided in the embodiments of the present invention. For corresponding features and descriptions, refer to the foregoing content related to the method, and details are not described in this embodiment.

All components of the terminal are introduced in detail below with reference to FIG. 11:

The RF circuit 110 may be configured to transmit and receive information, for example, to exchange information with devices such as a server, and transmit the received information to the processor 150 for processing. Usually, the RF circuit 110 includes but is not limited to an antenna, at least one amplifier, a transceiver, a coupler, a low noise amplifier (Low Noise Amplifier, LNA), and a duplexer. In addition, the RF circuit 110 may further communicate with another device over radio communication and a network. The radio communication may adopt any communication standard or protocol, including but not limited to global system for mobile communication (English: Global System of Mobile communication, GSM), general packet radio service (English: General Packet Radio Service, GPRS), code division multiple access (English: Code Division Multiple Access, CDMA), wideband code division multiple access (English: Wideband Code Division Multiple Access, WCDMA), long term evolution (English: Long Term Evolution, LTE), e-mail, and short messaging service (English: Short Messaging Service, SMS).

The memory 120 may be configured to store a software program or a module, and the processor 150 enables the terminal to perform the method for naming a folder by running the software program or the module that are stored in the memory 120. The memory 120 may mainly include a program storage area and a data storage area, where the program storage area may store an operating system and an application program that is required to implement the method for naming a folder, and the data storage area may store an application configuration file, and the like. In addition, the memory 120 may be a volatile memory (English: volatile memory), such as a random-access memory (English: random-access memory, RAM for short); the memory 120 may also be a non-volatile memory (English: non-volatile memory), such as a read-only memory (English: read-only memory, ROM for short), a flash memory (English: flash memory), a hard disk drive (English: hard disk drive, HDD for short), or a solid-state drive (English: solid-state drive, SSD for short); and the memory 120 may further include a combination of the foregoing types of memories.

The input unit 130 may be configured to receive information about numbers or symbols that are entered by a user, or information about an operation of dragging an application to create a folder by a user. Specifically, the input unit 130 may include a control panel 131 and another input device 132. The touch panel 131 may also be referred to as a touchscreen, and may collect touch operations made by a user on or near the touch panel (for example, operations made by the user on the touch panel 131 or near the touch panel 131 with a finger, a touch pen, or any suitable object or accessory), and drives a corresponding connection apparatus based on a preset program. Optionally, the touch panel 131 may include two parts, a touch detection apparatus and a touch controller. The touch detection apparatus detects a touch orientation of the user, detects a signal generated by a touch operation, and sends the signal to the touch controller. The touch controller receives touch information from the touch detection apparatus, converts the touch information into touch point coordinates, then sends the touch point coordinates to the processor 150, receives a command sent by the processor 150, and execute the command. In addition, the input unit 130 may implement the touch panel 131 in various types, such as a resistive type, a capacitive type, an infrared type, and a surface acoustic wave type. Except the touch panel 131, the input unit 130 may further include another device 132. Specifically, the another input device 132 may include but is not limited to one or more of a physical keyboard, a function key (such as a volume control key, and a switching key), a trackball, a mouse, and an operating arm.

The display unit 140 may be configured to display information input by the user, information provided for the user, or the like. The display unit 140 may include a display panel 141, and optionally, the display panel 141 may be configured in forms such as a liquid crystal display (English: Liquid Crystal Display, LCD), and an organic light-emitting diode (Organic Light-Emitting Diode, OLED). Further, the touch panel 131 may cover the display panel 141, and when the touch panel 131 detects an operation on or near the touch panel 131 of dragging an application to create a folder, sends the operation to the processor 150 to determine an application type of an application, and then the processor 150 provides a corresponding visual output of recommended names on the display panel 141 based on the application type of the application. Although in FIG. 11, the touch panel 131 and the display panel 141 serve as two independent parts to implement input and output functions of the terminal, in some embodiments, the touch panel 131 and the display panel 141 may be integrated to implement the input and output functions of the terminal.

The processor 150 is a control center of the terminal, is connected to all parts of the entire terminal by using various interfaces and lines, and performs the method for naming a folder by running or executing the software program and/or the module that are stored in the memory 120, and by invoking data stored in the memory 120. Optionally, the processor 150 may include one or more processing units. Preferably, the processor 150 may integrate an application processor and a modem processor. The application processor mainly processes an operating system, a user interface, an application program, and the like, and the modem processor mainly processes radio communication. It should be understood that the modem processor may not be integrated into the processor 150.

The terminal further includes a power supply 160 (for example, a battery) that supplies power to all parts, and preferably, the power supply may be logically connected to the processor 150 through a power supply management system, to implement functions such as charging, discharging, and power consumption management by using the power supply management system.

The terminal further includes a sensor 170. The terminal may include one or more sensors, and only one sensor is shown in the figure as an example. The terminal may include a plurality of types of sensors, which may include but is not limited to a pressure sensor, a distance sensor, an accelerator sensor, a gyroscope sensor, a GPS sensor, a direction sensor, and a temperature sensor. Different types of applications may use different sensors during running, and in this embodiment of the present invention, a type of an application may be determined based on information about the sensor in the application running process.

The memory 120 is configured to store a program instruction.

The processor 150 is configured to perform the following operations based on the program instruction stored in the memory 120: receiving, by the input unit 130, indication information about creating or updating a folder, where the folder includes at least one application; displaying, by using the display unit 140, at least one recommended name for the folder based on an application type of each of the at least one application; and using one of the at least one recommended name as a name of the folder based on confirmation information that is received by the input unit 130 that is from a user.

In an example, before the processor 150 performs the receiving, by the input unit 130, indication information about creating or updating a folder, the processor 150 is further configured to perform the following operations based on the program instruction stored in the memory 120:

determining the application type of each of the at least one application in at least one of the following manners: receiving, by using the communications interface (for example, the RF circuit 110), information that is pushed by a cloud and that is about the application type of each of the at least one application; querying information in an application configuration file, and determining the application type of the application based on the information in the application configuration file; and/or determining the application type of the application based on information about a sensor used in an application running process.

In an example, each application type has a corresponding identification feature; and the performing, by the processor 150, the operation of determining the application type of the application based on information about a sensor used in an application running process includes: if detecting that a feature in the application running process matches a preset identification feature of a first application type, determining that the application type of the application is the first application type, and the preset identification feature of the first application type includes the information about the sensor 170.

In an example, an identification feature of the game-type application includes: during running, the application is in a full-screen mode and an acceleration sensor or a gyroscope sensor are used for detection; or during running, the application is in a full-screen mode and it is detected by using a distance sensor that a distance between the user and the terminal in a first time length is kept not greater than a first threshold; or during running, the application is in a full-screen mode, and it is determined by using data collected by a pressure sensor that a quantity of times of tapping a screen by the user in the first time length is greater than a second threshold and utilization of a graphics processing unit GPU in the first time length is greater than a third threshold.

In an example, an identification feature of the e-book-type application includes: the application is capable of parsing a text file; or during running, the application is in a full-screen mode and it is detected by using a distance sensor that a distance between the user and the terminal in a second time length is kept not greater than a fourth threshold.

In an example, an identification feature of the video-type application includes: the application is capable of parsing a video file; or during running, the application is in a full-screen mode, audio is played, and it is detected by using a distance sensor that a distance between the user and the terminal in a third time length is kept not greater than a fifth threshold.

In an example, an identification feature of the map-type application includes: the application is capable of parsing geographical location coordinate data or during running, the application uses a GPS for positioning.

In an example, an identification feature of the sports-type application includes: the application uses a direction sensor in a fourth time length.

In an example, before the processor 150 performs the receiving, by the input unit 130, indication information about creating or updating a folder, the processor 150 is further configured to perform the following operations based on the program instruction stored in the memory 120: receiving, by using the communications interface, information that is pushed by a cloud and that is about application types of some applications in the at least one application; determining an application type of another application in the at least one application expect the some applications; and reporting the application type of the another application to the cloud by using the communications interface.

The terminal may further include a camera, a Bluetooth module, an audio circuit, a USB module, and the like not shown in the figure, and details are not described herein.

In this embodiment of the present invention, when the input unit 130 receives the indication information about creating or updating a folder, the processor 150 controls the display unit 140 to display at least one recommended name for the folder based on an application type of an application included in the folder. The recommended names are determined based on the application type of the application, which is a new folder naming manner. The naming manner is relatively easy to meet a user's requirement because of a reasonable naming rule. The user may select one recommended name of the recommended names as a name of the folder. It is convenient to operate and user experience is excellent.

In addition, the RF circuit 110 and the input unit 130 of the terminal in FIG. 11 may correspond to the receiving module 1001 in the terminal in FIG. 10; and the display unit 140, the processor 150, and the sensor 170 may correspond to the processing module 1002 in FIG. 10. Details are not described herein.

An ordinary person in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

A person of ordinary skill in the art may understand that all or some of the steps in each of the foregoing method of the embodiments may be implemented by a program instructing a processor. The foregoing program may be stored in a computer readable storage medium. The storage medium may be a non-transitory (English: non-transitory) medium, for example, may be a random-access memory, read-only memory, a flash memory, a hard disk, a solid state drive, a magnetic tape (English: magnetic tape), a floppy disk (English: floppy disk), an optical disc (English: optical disc), or any combination thereof.

The foregoing descriptions are merely example implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A terminal, comprising:
    input apparatus;
    a display;
    a memory coupled to the input apparatus and the display and configured to store a program instruction; and
    a processor coupled to the memory, the input apparatus and the display, wherein the program instruction causes the processor to be configured to:
        determine an application type based on sensor information concerning a sensor used in an application running process, wherein the application type comprises a corresponding identification feature;
        detect that a feature in the application running process matches a preset identification feature of a first application type, wherein the preset identification feature comprises the sensor information;
        determine, in response to the detecting, that the application type is a sports-type application, wherein the corresponding identification feature of the sports-type application comprises identifying that at least one application uses a direction sensor daring a set time length;
        receive, using the input apparatus, indication information concerning creating or updating a folder, wherein the folder comprises the at least one application;
        display, in response to the indication information and using the display, a plurality of options in a list for naming the folder, wherein the options comprise at least one recommended name for the folder based on the at least one application being the sports-type application and an option of a user-defined name;
        receive confirmation information of a user; and
        set either the at least one recommended name or a typed name from the option of the user-defined name of the folder based on the confirmation information.

2. The terminal of claim 1, wherein the corresponding identification feature of the application type comprises:
    identifying, during running, that the at least one application is in a full-screen mode and an acceleration sensor or a gyroscope sensor is used for detection;
    identifying, during running, that the at least one application is in the full-screen mode and detecting, using a distance sensor, that a distance between the user and the terminal in a first time length is kept less than or equal to a first threshold; or
    identifying, during running, that the at least one application is in the full-screen mode and determining, using data from a pressure sensor, that a quantity of times of tapping a screen by the user in the first time length is greater than a second threshold and utilization of a graphics processing unit (GPU) in the first time length is greater than a third threshold.

3. The terminal of claim 1, wherein the indication information concerning creating the folder comprises dragging a plurality of applications into one folder.

4. A computer program product comprising computer-executable instructions for storage on a non-transitory computer-readable medium that, when executed by a processor, cause a terminal to:
    determine an application type based on sensor information concerning a sensor used in an application running process, wherein the application type comprises a corresponding identification feature;
    detect that a feature in the application running process matches a preset identification feature of a first application type wherein the preset identification feature comprises the sensor information;
    determine, in response to the detecting, that the application type is a sports-type application, wherein the corresponding identification feature of the sports-type application comprises identifying that at least one application uses a direction sensor during a set time length;
    receive indication information concerning creating or updating a folder, wherein the folder comprises the at least one application;
    display, in response to the indication information, a plurality of options in a list for naming the folder, wherein the options comprise at least one recommended name for the folder based on the at least one application being the sports-type application and an option of a user-defined name;
    receive confirmation information from a user; and
    set either the at least one recommended name or a typed name from the option of the user-defined name of the folder based on the confirmation information.

5. A method for naming a folder and implemented by a terminal, the method comprising:
    determining an application type based on sensor information concerning a sensor used in an application running process, wherein the application type comprises a corresponding identification feature;
    detecting that a feature in the application running process matches a preset identification feature of a first application type, wherein the preset identification feature comprises the sensor information;

determining, in response to the detecting, that the application type is a sports-type application, wherein the corresponding identification feature of the sports-type application comprises identifying that at least one application uses a direction sensor during a set time length;

receiving indication information concerning creating or updating the folder, wherein the folder comprises the at least one application;

displaying, in response to the indication information, a plurality of options in a list for naming the folder, wherein the options comprise a recommended name for the folder based on the at least one application being the sports-type application and an option of a user-defined name;

receiving confirmation information from a user; and setting either the recommended name or a typed name from the option of the user-defined name of the folder based on the confirmation information.

6. The method of claim 5, wherein before receiving the indication information, the method further comprises:

receiving first information from a cloud concerning application types of a subset of applications in the at least one application;

determining an application type of a second application in the at least one application except the subset of applications; and reporting the application type of the second application to the cloud.

7. The method of claim 5, wherein the corresponding identification feature of the application type comprises:

identifying, during running, that the at least one application is in a full-screen mode and an acceleration sensor or a gyroscope sensor is used for detection;

identifying, during running, that the at least one application is in the full-screen mode and detecting, using a distance sensor, that a distance between the user and the terminal in a first time length is kept less than or equal to a first threshold; or identifying, during running, that the at least one application is in the full-screen mode and determining, using data from a pressure sensor, that a quantity of times of tapping a screen by the user in the first time length is greater than a second threshold and utilization of a graphics processing unit (GPU) in the first time length is greater than a third threshold.

8. The computer program product of claim 4, wherein before receiving the indication information, the computer-executable instructions further cause the terminal to:

receive first information from a cloud concerning application types of a subset of applications in the at least one application;

determine an application type of a second application in the at least one application except the subset of applications; and report the application type of the second application to the cloud.

9. The computer program product of claim 4, wherein the corresponding identification feature of the application type comprises:

identifying, during running, that the at least one application is in a full-screen mode and an acceleration sensor or a gyroscope sensor is used for detection;

identifying, during running, that the at least one application is in the full-screen mode and detecting, using a distance sensor, that a distance between the user and the terminal in a first time length is kept less than or equal to a first threshold; or identifying, during running, that the at least one application is in the full-screen mode and determining, using data from a pressure sensor, that a quantity of times of tapping a screen by the user in the first time length is greater than a second threshold and utilization of a graphics processing unit (GPU) in the first time length is greater than a third threshold.

\* \* \* \* \*

UNITED STATES PATENT AND TRADEMARK OFFICE
CERTIFICATE OF CORRECTION

| | | |
|---|---|---|
| PATENT NO. | : 11,636,066 B2 | |
| APPLICATION NO. | : 16/632796 | |
| DATED | : April 25, 2023 | |
| INVENTOR(S) | : Huaxi Liu and Jun Hu | |

It is certified that error appears in the above-identified patent and that said Letters Patent is hereby corrected as shown below:

In the Claims

Claim 4, Column 22, Line 39: "type wherein" should read "type, wherein"

Signed and Sealed this
Thirtieth Day of May, 2023

Katherine Kelly Vidal
*Director of the United States Patent and Trademark Office*